United States Patent
Yu

(10) Patent No.: US 9,213,164 B2
(45) Date of Patent: Dec. 15, 2015

(54) FIVE-PIECE IMAGING LENS ASSEMBLY

(71) Applicant: ABILITY OPTO-ELECTRONICS TECHNOLOGY CO., LTD., Taichung County (TW)

(72) Inventor: Hung-Kuo Yu, Taichung (TW)

(73) Assignee: ABILITY OPTO-ELECTRONICS TECHNOLOGY CO., LTD., Taichung County (TW)

( * ) Notice: Subject to any disclaimer, the term of this patent is extended or adjusted under 35 U.S.C. 154(b) by 0 days.

(21) Appl. No.: 14/465,429

(22) Filed: Aug. 21, 2014

(65) Prior Publication Data

US 2015/0260951 A1    Sep. 17, 2015

(30) Foreign Application Priority Data

Mar. 13, 2014   (TW) .............................. 103109077 A

(51) Int. Cl.
*G02B 9/60* (2006.01)
*G02B 13/00* (2006.01)
*G02B 13/18* (2006.01)
*H04N 5/225* (2006.01)

(52) U.S. Cl.
CPC .............. *G02B 9/60* (2013.01); *G02B 13/0015* (2013.01); *G02B 13/0045* (2013.01); *G02B 13/18* (2013.01); *H04N 5/2254* (2013.01)

(58) Field of Classification Search
CPC ............................ G02B 13/0045; G02B 13/18
USPC .......................................... 359/714, 753, 746
See application file for complete search history.

(56) References Cited

FOREIGN PATENT DOCUMENTS

TW         201300869 A1      1/2013

*Primary Examiner* — Scott J Sugarman
*Assistant Examiner* — Mitchell Oestreich
(74) *Attorney, Agent, or Firm* — Muncy, Geissler, Olds & Lowe, P.C.

(57) ABSTRACT

The present disclosure illustrates a five-piece imaging lens assembly which includes an aperture stop, an optical lens assembly, an image plane. The optical lens assembly, in order from an object side to an image side, includes a first lens element with positive refractive power adjacent to the optical axis and having a convex object-side surface, a second lens element with negative refractive power adjacent to the optical axis and having a concave object-side surface, a third lens element and a fourth lens element with refractive power adjacent to the optical axis, and a fifth lens element with negative refractive power adjacent to the optical axis and having a convex image-side surface. At least one of the object-side surface and the image-side surface of the fifth lens element has an inflection point. The image plane is for image formation for an object.

9 Claims, 13 Drawing Sheets

FIVE-PIECE IMAGING LENS ASSEMBLY

CROSS-REFERENCE TO RELATED APPLICATION

This application claims the benefit of Taiwan Patent Application No. 103109077, filed on Mar. 13, 2014, in the Taiwan Intellectual Property Office, the disclosure of which is incorporated herein in its entirety by reference.

BACKGROUND OF THE INVENTION

1. Field of the Invention

The present disclosure relates to an imaging lens assembly, in particular to a thin five-piece imaging lens assembly suitable for being applied on the electronic product.

2. Description of the Related Art

Recently, with continuous development of electronic products having imaging function, the requirement for thin camera lenses increases correspondingly. The common image sensor unit applied in the camera lens is a charge coupled device (CCD) or a CMOS sensor. With the advance of the semiconductor manufacture process technology, the pixel size of the image sensor becomes smaller, so thin the camera lens is developed toward field of high resolution of pixels correspondingly. Therefore, the requirement for imaging quality also increases.

In various optical design for thin five-piece optical lens assembly with fixed focus length, the traditional technology utilizes the combination of a lens element with positive refractive power and a lens element with negative refractive power, such as combination of a fourth lens element with negative refractive power and a fifth lens element with negative refractive power, to increase back focus length of optical image capturing, but it causes a longer total length of the optical system.

Therefore, what is need is to efficiently shorten the total length of the optical lens assembly and further combine multiple lenses to further improve quality of imaging.

SUMMARY OF THE INVENTION

An aspect of an exemplary embodiment of the present disclosure directs to a five-piece imaging lens assembly which utilizes the combination of the five lens elements with the refractive powers, inflection points, convex surfaces or concave surfaces, to efficiently shorten total length of the imaging lens assembly and improve the imaging quality of the imaging lens assembly.

An exemplary embodiment of the present disclosure provides a five-piece imaging lens assembly which comprises an aperture stop, an optical lens assembly, and an image plane. The optical lens assembly includes, in order from an object side to an image side, a first lens element with positive refractive power and having convex object-side surface adjacent to the optical axis, a second lens element having concave object-side surface adjacent to the optical axis, a third lens element with refractive power adjacent to the optical axis, a fourth lens element with refractive power adjacent to the optical axis, and a fifth lens element with negative refractive power adjacent to the optical axis and having convex image-side surface adjacent to the optical axis. One of the object-side surface and the image-side surface of the fifth lens element has at least one inflection point. The image plane is for image formation for an object. The maximum height difference of the fifth lens element approaching the image-side surface and the optical axis being the center within the diameter range of the aperture stop is S10H, the diameter of the aperture stop is AD, and they satisfy the relations: $|S10H/AD|*100<1.5$.

Preferably, a focus length of the optical lens assembly is f, a half of the maximal field of view of the optical lens assembly is HFOV, a distance along the optical axis from the aperture stop to the image-side surface of the fifth lens element is STL, the distance along the optical axis from the object-side surface of the first lens element to the image-side surface of the fifth lens element is FL, a distance along the optical axis from the object-side surface of the first lens element to the image plane is TTL, and a distance along the optical axis from the image-side surface of the fourth lens element to the object-side surface of the fifth lens element is T45, and a distance along the optical axis from the image-side surface of the fifth lens element to the image plane is BFL, and they satisfy the relations: $0.1<AD/f<1.0$, $5.0<HFOV/f<20.0$, $0.5<STL/FL<1.2$, $3.0<TTL/T45<9.0$, $2.0<TTL/BFL<6.0$.

Preferably, a central thickness of the first lens element is ct1, and a central thickness of the second lens element is ct2, and they satisfy the relations: $1.0<ct1/ct2<5.0$.

An exemplary embodiment of the present disclosure provides a five-piece imaging lens assembly which includes an aperture stop, an optical lens assembly, and an image plane. The optical lens assembly includes, in order from an object side to an image side, a first lens element with positive refractive power and having convex object-side surface adjacent to the optical axis, a second lens element with negative refractive power adjacent to the optical axis and having a concave object-side surface adjacent to the optical axis, a third lens element with refractive power adjacent to the optical axis, a fourth lens element with positive refractive power adjacent to the optical axis, a fifth lens element with negative refractive power adjacent to the optical axis and having a convex image-side surface adjacent to the optical axis. One of the object-side surface and the image-side surface of the fifth lens element has an inflection point. The image plane is for image formation for an object. A diameter of the aperture stop is AD, a diagonal length of an imaging area formed on the image plane by the maximal field of view of the optical lens assembly is Dg, and they satisfy the relations: $0.0<AD/Dg<0.5$.

Preferably, the focus length of the optical lens assembly is f, the half of the maximal field of view of the optical lens assembly is HFOV, the distance along the optical axis from the aperture stop to the image-side surface of the fifth lens element is STL, the distance along the optical axis from the object-side surface of the first lens element to the image-side surface of the fifth lens element is FL, and they satisfy the relations: $0.1<AD/f<1.0$, $5.0<HFOV/f<20.0$, $0.5<STL/FL<1.2$.

Preferably, the distance along the optical axis from the object-side surface of the first lens element to the image plane is TTL, the distance along the optical axis from the image-side surface of the fourth lens element to the object-side surface of the fifth lens element is T45, the distance along the optical axis from the image-side surface of the fifth lens element to the image plane is BFL, the central thickness of the first lens element is ct1, the central thickness of the second lens element is ct2, and they satisfy the relations: $3.0<TTL/T45<9.0$, $2.0<TTL/BFL<6.0$, $1.0<ct1/ct2<5.0$.

An exemplary embodiment of the present disclosure provides a five-piece image capture module which includes an aperture stop, an optical lens assembly, and an image sensor unit. The optical lens assembly includes, in order from an object side to an image side, a first lens element with positive refractive power and having convex object-side surface adjacent to the optical axis, a second lens element with negative refractive power adjacent to the optical axis and having a concave object-side surface adjacent to the optical axis, a third lens element with refractive power adjacent to the optical axis, a fourth lens element with refractive power adjacent to the optical axis and made of plastic, a fifth lens element with negative refractive power adjacent to the optical axis and having a convex image-side surface adjacent to the optical axis, and one of the object-side surface and the image-side surface of the fifth lens element has an inflection point, the fifth lens element made of plastic. An image sensing unit which is disposed on an image plane for image formation for an object. The distance along the optical axis from the object-side surface of the first lens element to the image plane is TTL, the distance along the optical axis from the image-side surface of the fourth lens element to the object-side surface of the fifth lens element is T45, the distance along the optical axis from the image-side surface of the fifth lens element to the image plane is BFL, and they satisfy the relations: $3.0 < TTL/T45 < 9.0$, $2.0 < TTL/BFL < 6.0$.

Preferably, the diameter of the aperture stop is AD, the half of the maximal field of view of the optical lens assembly is HFOV, the distance along the optical axis from the aperture stop to the image-side surface of the fifth lens element is STL, the distance along the optical axis from the object-side surface of the first lens element to the image-side surface of the fifth lens element is FL, and they satisfy the relations: $0.1 < AD/f < 1.0$, $5.0 < HFOV/f < 20.0$, $0.5 < STL/FL < 1.2$.

Preferably, the central thickness of the first lens element is ct1, the central thickness of the second lens element is ct2, and they satisfy the relations: $1.0 < ct1/ct2 < 5.0$.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
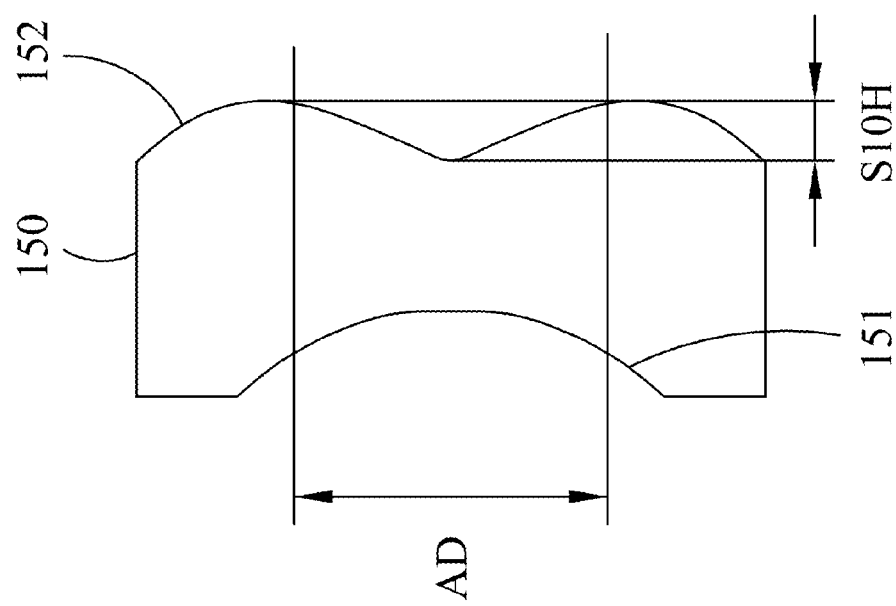
FIG. 1 is a schematic view of a parameter "S10H" of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2A:
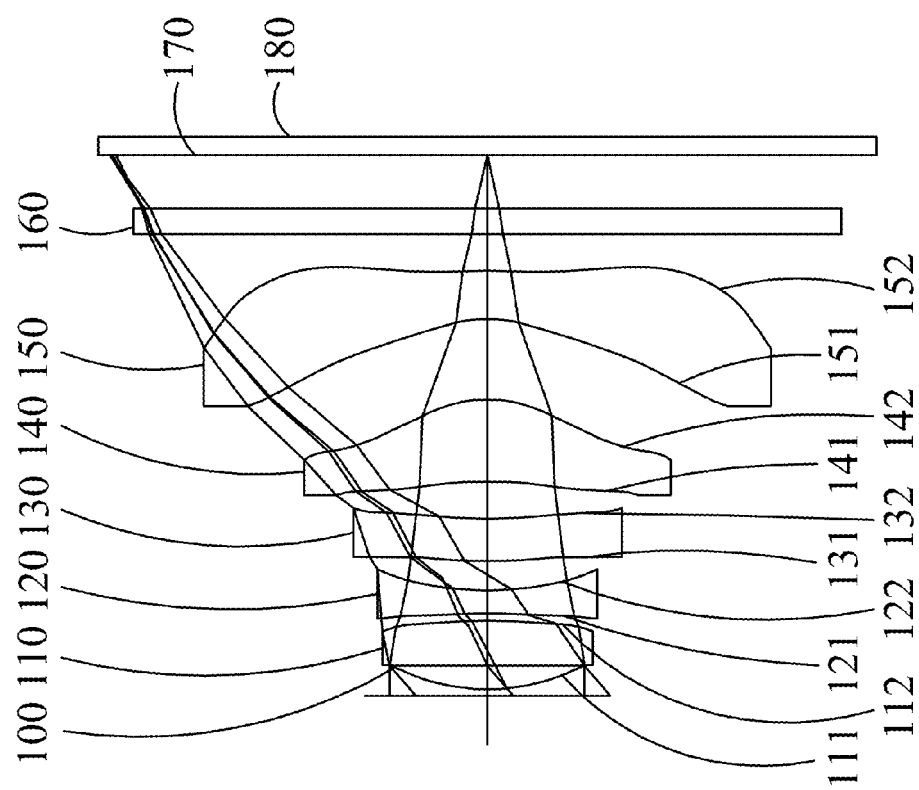
FIG. 2A is a schematic view of a first embodiment of a five-piece imaging lens assembly of the present disclosure.

Please refer to FIG. 1 and FIG. 2A. FIG. 1 is a schematic view of a parameter "S10H" of the present disclosure. FIG. 2A is a schematic view of a first embodiment of a five-piece imaging lens assembly of the present disclosure. As shown in FIG. 2A, the present disclosure includes an optical lens assembly, in order from an object side to an image side, includes a first lens element 110, a second lens element 120, a third lens element 130, a fourth lens element 140 and a fifth lens element 150.

The first lens element 110 has positive refractive power and a convex object-side surface 111. The second lens element 120 has negative refractive power and a concave object-side surface 121. The third lens element 130 has refractive power. In the first embodiment, the fourth lens element 140 having negative refractive power is taken as an example, but the present disclosure is not limited thereto. In implementation, the fourth lens element 140 can have positive refractive power, or the fourth lens element 140 can be made of plastic.

In the first embodiment, the fifth lens element 150 has negative refractive power and a convex image-side surface 152, and at least one of the object-side surface 151 and the image-side surface 152 of the fifth lens element has at least one inflection point, but it is just an example and the present disclosure is not limited thereto. The fifth lens element 150 can be made of plastic. The optical surface of the present disclosure can be made in a shape not sphere, to obtain more control variables for decreasing aberration, and the number and total length of lenses can be reduced efficiently.

The five-piece imaging lens assembly of the present disclosure further includes an aperture stop 100 and an infrared cut-off filter 160. The infrared cut-off filter 160 is disposed between the fifth lens element 150 and the image plane 170. In implementation, the infrared cut-off filter 160 is usually made of optical plate material and does not affect the focus length of the five-piece imaging lens assembly of the present disclosure.

The five-piece imaging lens assembly further includes an image plane 170 located on an image sensor unit 180 for imaging object. The first lens element 110, the second lens element 120, the third lens element 130, the fourth lens element 140, and fifth lens element 150 can be made of plastic material or glass material, and an equation (1) of the aspheric surface profiles of the aforementioned lens elements of the first embodiment is expressed as follows:

$$z=ch^2/[1+[1-(k+1)c^2h^2]^{0.5}]+Ah^4+Bh^6+Ch^8+Dh^{10}+Eh^{12}+Fh^{14}+Gh^{16}+Hh^{18}+Jh^{20}+\ldots \quad (1)$$

z is a position value referring to a top of the surface at height h along the optical axis, k is metric cone constant, c is the reciprocal of the curvature radius, and A, B, C, D, E, F, G, H and J are high-order aspherical coefficients.

The detailed optical data of the first embodiment is shown in table 1, and the object-side surfaces and the image-side surfaces of the first lens element 110 to the fifth lens element 150 are made according to the equation (1), and their aspheric parameters are shown in table 2. The maximum height difference S10H of the fifth lens element approaching the image-side surface and the optical axis being the center within the diameter range of the aperture stop is 0.0072 mm, and the diameter AD of the aperture stop is 1.580 mm, the focus length f of the optical lens assembly is 3.556 mm, the half of the maximal field of view HFOV of the optical lens assembly is 38.495 deg, the distance STL along the optical axis from the aperture stop to the image-side surface of the fifth lens element is 3.231 mm, the distance FL along the optical axis from the object-side surface of the first lens element to the image-side surface of the fifth lens element is 3.427 mm, the distance T45 along the optical axis from the image-side surface of the fourth lens element to the object-side surface of the fifth lens element is 0.659 mm, distance BFL along the optical axis from the image-side surface of the fifth lens element to the image plane is 0.948 mm, distance TTL along the optical axis from the object-side surface of the from first lens element to the image plane is 4.376 mm, the central thickness ct1 of the first lens element is 0.563 mm, the central thickness ct2 of the second lens element is 0.191 mm, the diagonal length Dg of an imaging area formed on the image plane by the maximal field of view of the optical lens assembly is 5.712 mm, |S10H/AD|*100=0.4557, AD/f=0.444, HFOV/f=10.825, STL/FL=0.943, TTL/T45=6.640, TTL/BFL=4.616, ct1/ct2=2.948, AD/Dg=0.2766.

TABLE 1 detailed optical data of the lenses of the first embodiment
Detailed optical data of lenses of the first embodiment

| | Surface | Radius (mm) | Thickness (mm) | Nd | Vd |
|---|---|---|---|---|---|
| Aperture stop | | ∞ | −0.196 | | |
| First lens element | First surface | 1.590 | 0.563 | 1.544 | 56.093 |
| | Second surface | −3.800 | 0.057 | | |
| Second lens element | Third surface | −4.198 | 0.191 | 1.607 | 26.646 |
| | Fourth surface | 2.775 | 0.237 | | |
| Third lens element | Fifth surface | 3.210 | 0.349 | 1.643 | 22.465 |
| | Sixth surface | 4.090 | 0.304 | | |

TABLE 1-continued detailed optical data of the lenses of the first embodiment
Detailed optical data of lenses of the first embodiment

| | Surface | Radius (mm) | Thickness (mm) | Nd | Vd |
|---|---|---|---|---|---|
| Fourth lens element | Seventh surface | −3.063 | 0.669 | 1.544 | 56.093 |
| | Eighth surface | −0.986 | 0.659 | | |
| Fifth lens element | Ninth surface | −1.004 | 0.398 | 1.514 | 56.782 |
| | Tenth surface | −8.732 | 0.300 | | |
| Cut-off filter | Eleventh surface | ∞ | 0.210 | 1.517 | 64.167 |
| | Twelfth surface | ∞ | 0.438 | | |

TABLE 2 the aspheric parameters of the first embodiment

| | Optical surface | | | | |
|---|---|---|---|---|---|
| | 1 | 2 | 3 | 4 | 5 |
| k | 2.2376 | 0 | 8.4644 | 0 | 0 |
| A | −0.0894 | 0.2813 | 0.3798 | 0.0597 | −0.2340 |
| B | 0.2540 | −0.4043 | −0.5451 | −0.3676 | 0.3777 |
| C | −2.7571 | −0.7701 | −0.3504 | 1.7420 | −1.7881 |
| D | 10.9832 | 5.5384 | 5.0440 | −3.8192 | 4.4901 |
| E | −23.9630 | −14.0815 | −14.5992 | 4.1468 | −5.5646 |
| F | 26.3836 | 15.7698 | 17.3662 | −2.1170 | 3.5624 |
| G | −12.0525 | −6.5147 | −7.2772 | 0.4237 | −0.9683 |
| H | 0 | 0 | 0 | 0 | 0 |
| J | 0 | 0 | 0 | 0 | 0 |

| | Optical surface | | | | |
|---|---|---|---|---|---|
| | 6 | 7 | 8 | 9 | 10 |
| k | 0 | −83.0854 | −0.6203 | −2.9684 | 0 |
| A | −0.1137 | −0.3247 | 0.1632 | 0.2652 | 0.1917 |
| B | 0.3069 | 1.0941 | −0.0404 | −0.2512 | −0.1797 |
| C | −1.0355 | −1.5761 | 0.2861 | 0.1057 | 0.0885 |
| D | 1.6281 | 1.2850 | −0.3142 | −0.0180 | −0.0280 |
| E | −1.3481 | −0.6380 | 0.1575 | −0.0014 | 0.0055 |
| F | 0.6416 | 0.1897 | −0.0399 | 0.0009 | −0.0006 |
| G | −0.1416 | −0.0282 | 0.0043 | −0.0001 | 3.005e−005 |
| H | 0 | 0 | 0 | 0 | 0 |
| J | 0 | 0 | 0 | 0 | 0 |

Figure 2B:
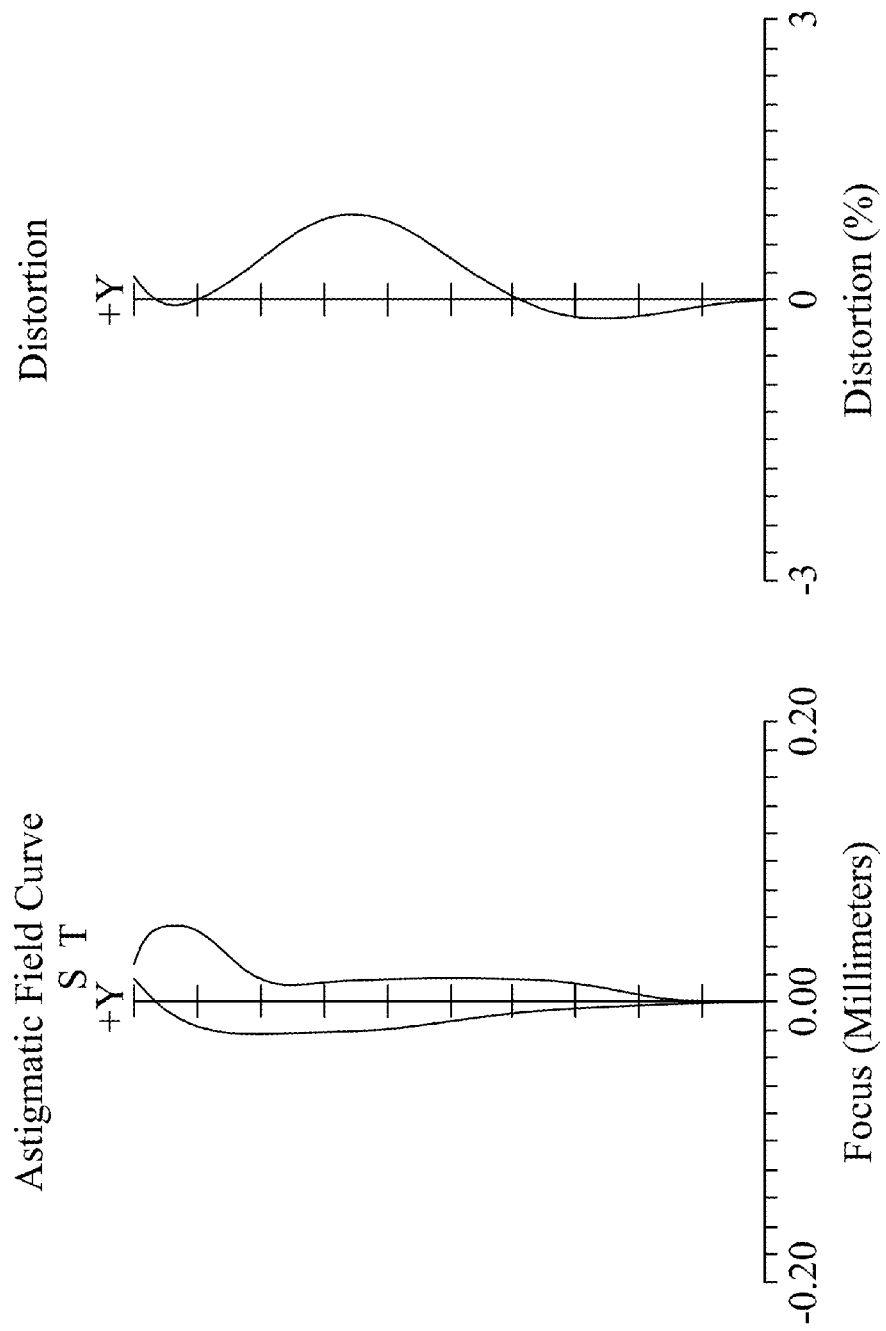
FIG. 2B is a curve diagram of the astigmatic field curve and the distortion of the first embodiment of the present disclosure.
Figure 2C:
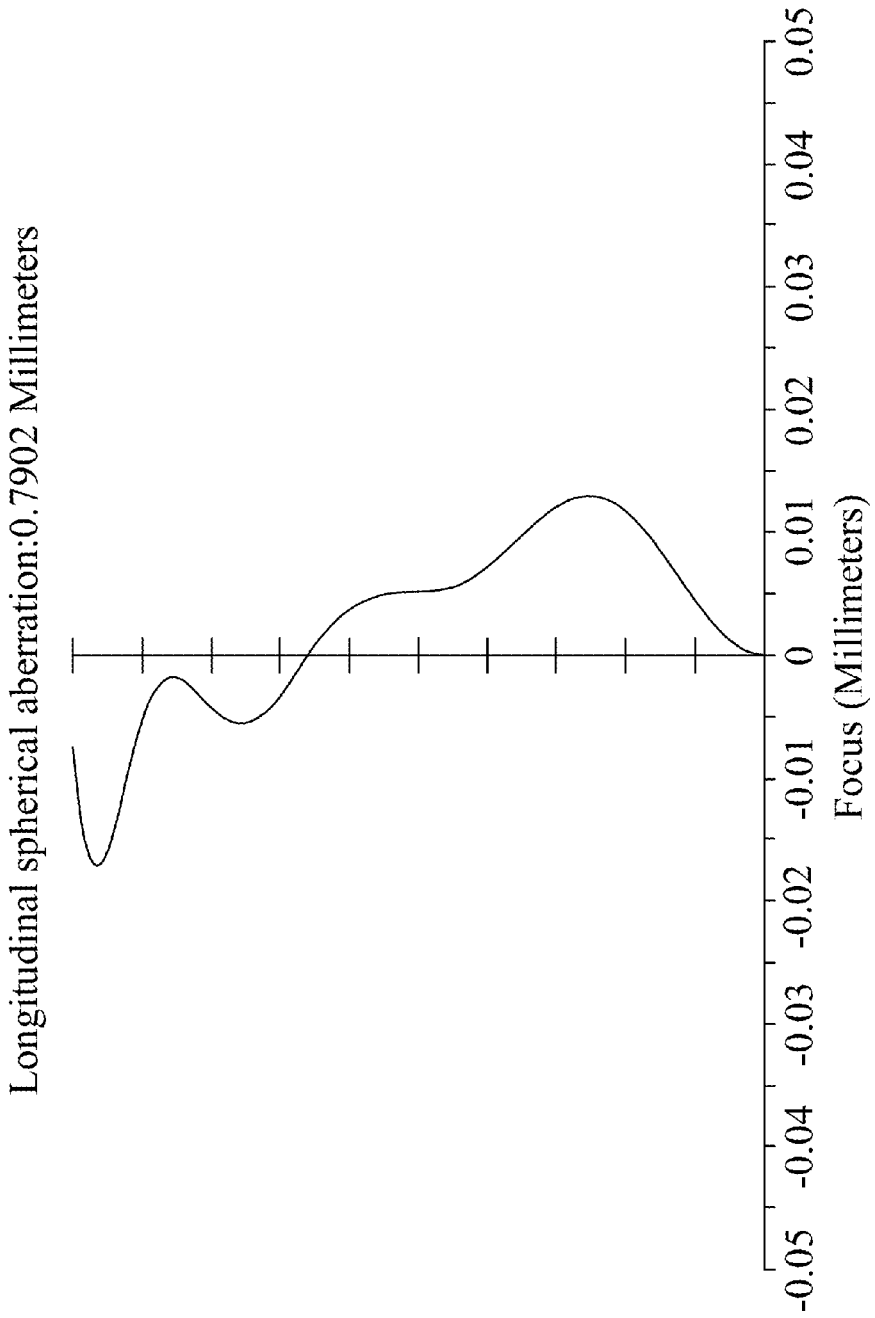
FIG. 2C is a curve diagram of the longitudinal spherical aberration of the first embodiment of the present disclosure.

According to the detailed optical data of the lenses in table 1 and the aberration curve shown in FIG. 2B and FIG. 2C, the first embodiment of the five-piece imaging lens assembly of the present disclosure has fine compensation for astigmatic field, distortion, and spherical aberration.

Figure 3A:
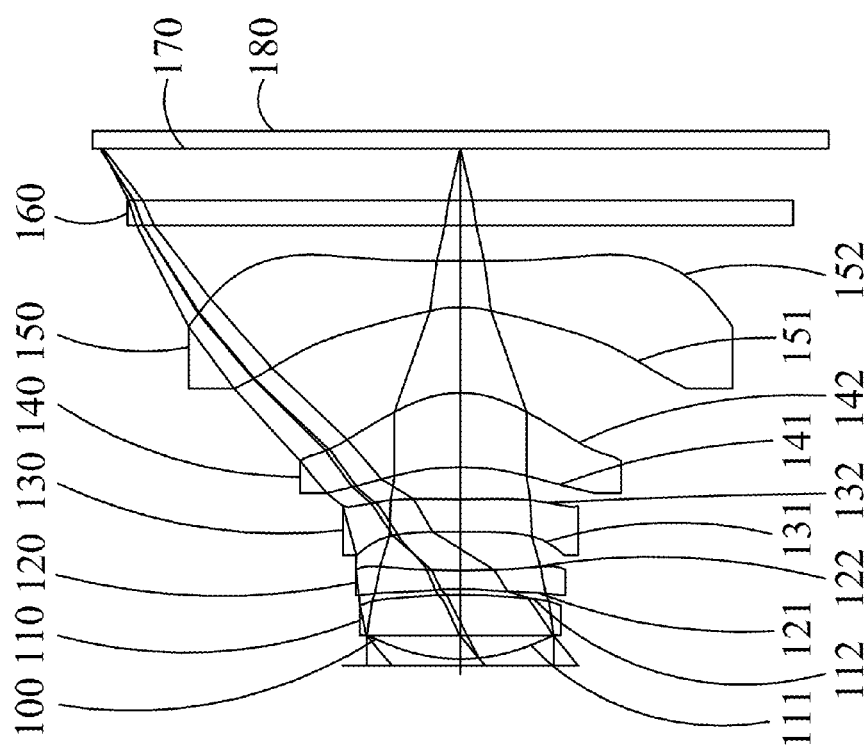
FIG. 3A is a schematic view of a second embodiment of the five-piece imaging lens assembly of the present disclosure.

Please refer to FIG. 3A which is a schematic view of a second embodiment of the five-piece imaging lens assembly of the present disclosure. As shown in FIG. 3A, the structures of the lenses of the second embodiment are similar to that of the first embodiment, but their differences are in the detailed optical data shown in table 3. The object-side surfaces and the image-side surfaces of the first lens element 110 to the fifth lens element 150 are made according to the equation (1).

The object-side surfaces and the image-side surfaces of the first lens element 110 to the fifth lens element 150 are made according to the equation (1), and their aspheric parameters are shown in table 4. The maximum height difference S10H of the fifth lens element approaching the image-side surface and the optical axis being the center within the diameter range of the aperture stop is 0.0170 mm, and the diameter AD of the aperture stop is 1.579 mm, the focus length f of the optical lens assembly is 3.522 mm, the half of the maximal field of view HFOV of the optical lens assembly is 38.485 deg, the distance STL along the optical axis from the aperture stop to the image-side surface of the fifth lens element is 3.181 mm, the distance FL along the optical axis from the object-side surface of the first lens element to the image-side surface of the fifth lens element is 3.377 mm, the distance T45 along the optical axis from the image-side surface of the fourth lens element to the object-side surface of the fifth lens element is 0.727 mm, distance BFL along the optical axis from the image-side surface of the fifth lens element to the image plane is 0.953 mm, the distance TTL along the optical axis from the object-side surface of the from first lens element to the image plane is 4.330 mm, the central thickness ct1 of the first lens element is 0.544 mm, the central thickness ct2 of the second lens element is 0.159 mm, the diagonal length Dg of an imaging area formed on the image plane by the maximal field of view of the optical lens assembly is 5.712 mm, |S10H/AD|*100=1.0766, AD/f=0.448, HFOV/f=10.927, STL/FL=0.942, TTL/T45=5.956, TTL/BFL=4.544, ct1/ct2=3.421, AD/Dg=0.2764.

TABLE 3 detailed optical data of lenses of the second embodiment.
Detailed optical data of lenses of the second embodiment

| Surface | | Radius (mm) | Thickness (mm) | Nd | Vd |
|---|---|---|---|---|---|
| Aperture stop | | ∞ | −0.196 | | |
| First lens element | first surface | 1.549 | 0.544 | 1.544 | 56.093 |
| | Second surface | −4.728 | 0.049 | | |
| Second lens element | Third surface | −3.182 | 0.159 | 1.607 | 26.646 |
| | Fourth surface | 9.959 | 0.326 | | |
| Third lens element | Fifth surface | 18.268 | 0.276 | 1.643 | 22.465 |
| | Sixth surface | 11.105 | 0.272 | | |
| Fourth lens element | Seventh surface | −2.047 | 0.631 | 1.544 | 56.093 |
| | Eighth surface | −0.925 | 0.727 | | |
| Fifth lens element | Ninth surface | −1.120 | 0.395 | 1.514 | 56.782 |
| | Tenth surface | −12.728 | 0.300 | | |
| Cut-off filter | Eleventh surface | ∞ | 0.210 | 1.517 | 64.167 |
| | Twelfth surface | ∞ | 0.443 | | |

TABLE 4 the aspheric parameters of the second embodiment

| | Optical surface | | | | |
|---|---|---|---|---|---|
| | 1 | 2 | 3 | 4 | 5 |
| k | 2.0164 | 6.6435 | 0.4276 | 64.6931 | −7450.886 |
| A | −0.0884 | 0.1422 | 0.3288 | 0.1188 | −0.2958 |
| B | 0.2581 | −0.1594 | −0.4783 | −0.4406 | 0.2370 |
| C | −2.9178 | −0.8390 | 0.0501 | 1.4853 | −1.9574 |
| D | 11.3766 | 5.4556 | 4.1397 | −3.4236 | 4.8598 |
| E | −24.2843 | −14.5344 | −13.8991 | 4.0257 | −5.6746 |
| F | 26.1810 | 17.0196 | 17.5411 | −2.7648 | 2.7318 |
| G | −11.7007 | −7.4019 | −7.8411 | 0.8601 | −0.1414 |
| H | 0 | 0 | 0 | 0 | 0 |

TABLE 4-continued the aspheric parameters of the second embodiment

| | | | | | |
|---|---|---|---|---|---|
| J | 0 | 0 | 0 | 0 | 0 |

| | Optical surface | | | | |
|---|---|---|---|---|---|
| | 6 | 7 | 8 | 9 | 10 |
| k | 76.8912 | −34.4940 | −0.6262 | −3.7529 | −8.4542 |
| A | −0.2422 | −0.4799 | 0.1488 | 0.2562 | 0.1923 |
| B | 0.3425 | 1.2791 | −0.0304 | −0.2526 | −0.1837 |
| C | −0.9716 | −1.7456 | 0.2252 | 0.1063 | 0.0898 |
| D | 1.5096 | 1.2777 | −0.2561 | −0.0184 | −0.0279 |
| E | −1.3368 | −0.4583 | 0.1460 | −0.0012 | 0.0054 |
| F | 0.7709 | 0.0647 | −0.0407 | 0.0009 | −0.0006 |
| G | −0.1805 | −0.0034 | 0.0042 | −0.0001 | 2.785e−005 |
| H | 0 | 0 | 0 | 0 | 0 |
| J | 0 | 0 | 0 | 0 | 0 |

Figure 3B:
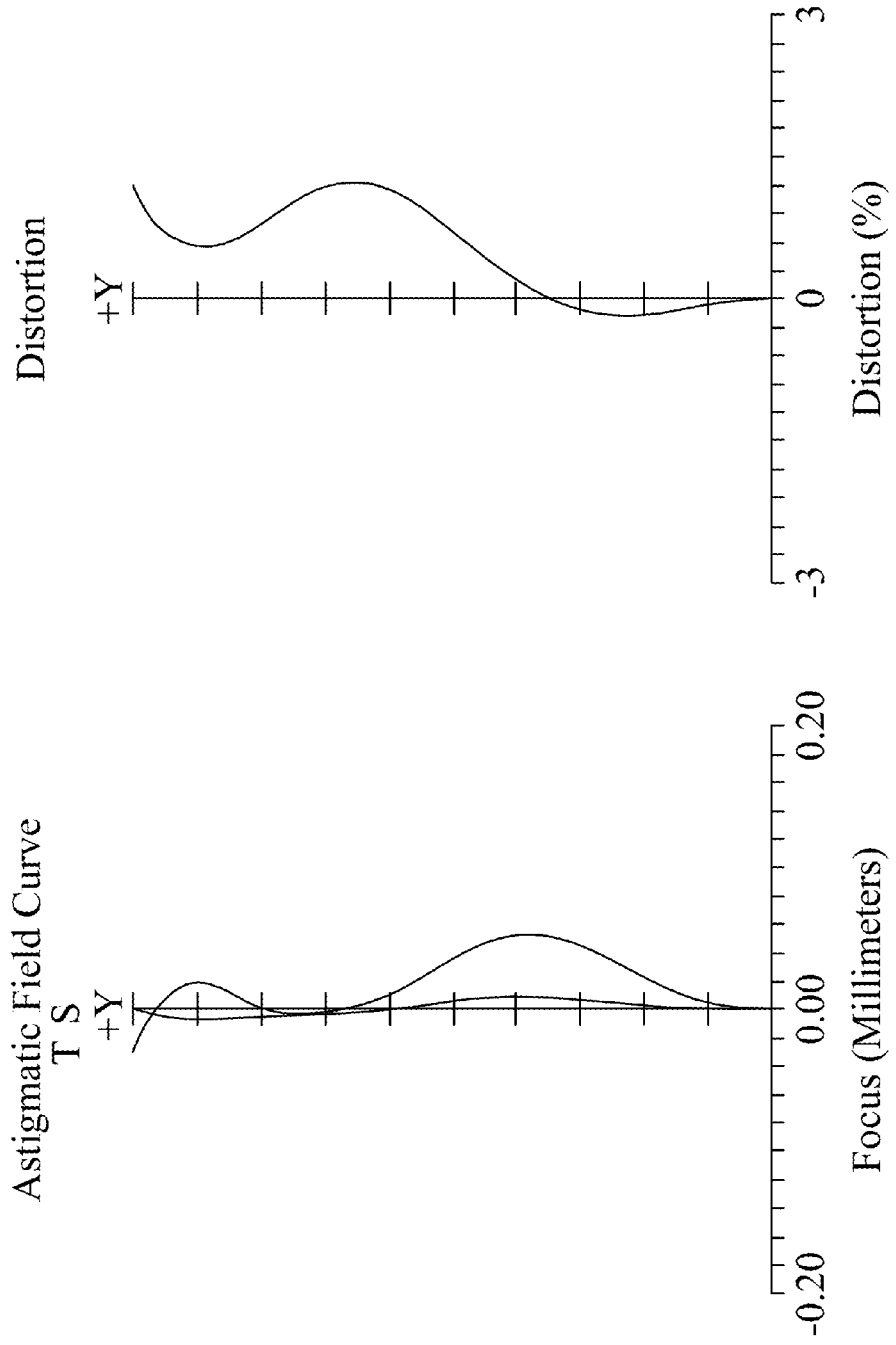
FIG. 3B is a curve diagram of the astigmatism and the distortion of the second embodiment of the present disclosure.
Figure 3C:
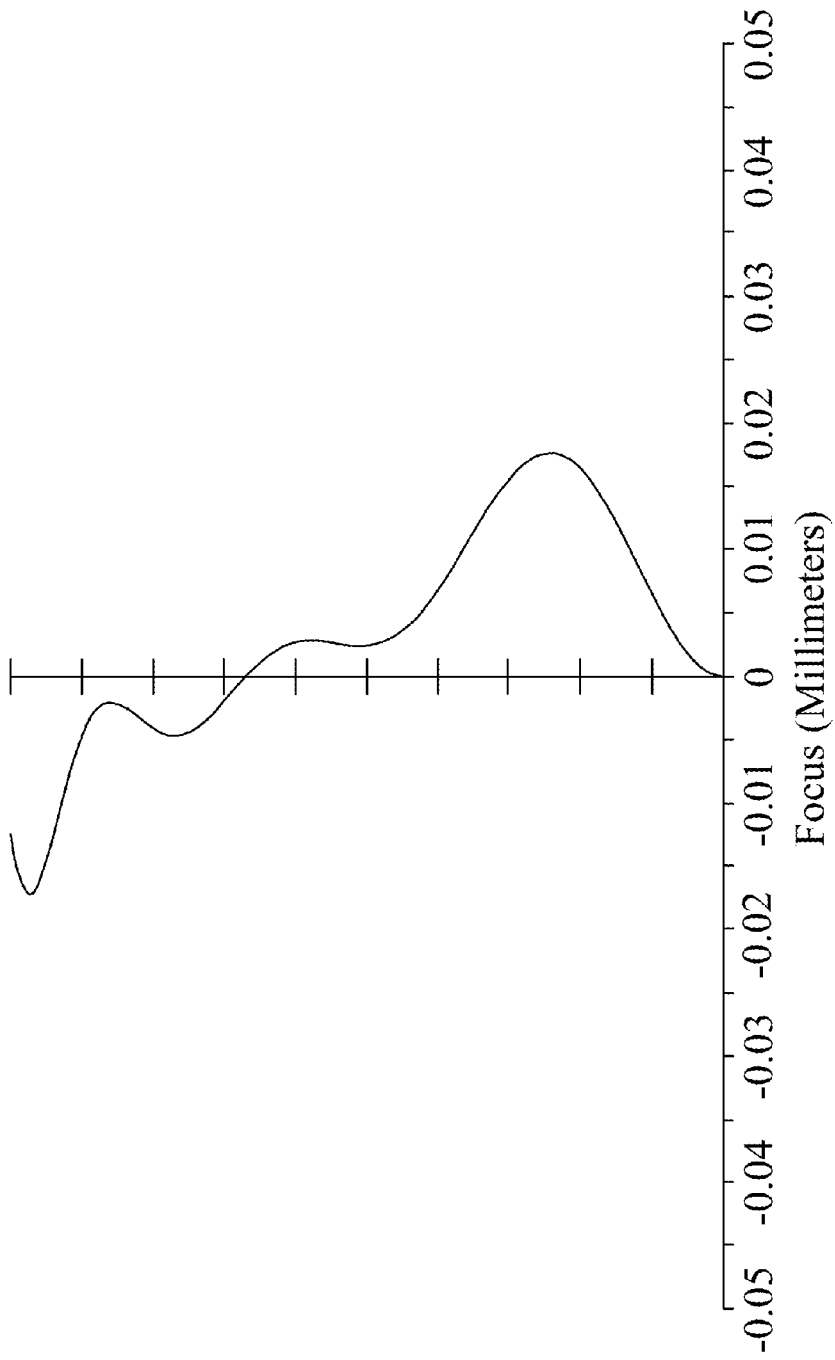
FIG. 3C is a curve diagram of the longitudinal spherical aberration of the second embodiment of the present disclosure.

According to the detailed optical data of lenses in table 3 and the aberration curve shown in FIG. 3B and FIG. 3C, the second embodiment of the five-piece imaging lens assembly of the present disclosure has fine compensation for astigmatic field, distortion, and spherical aberration.

Figure 4A:
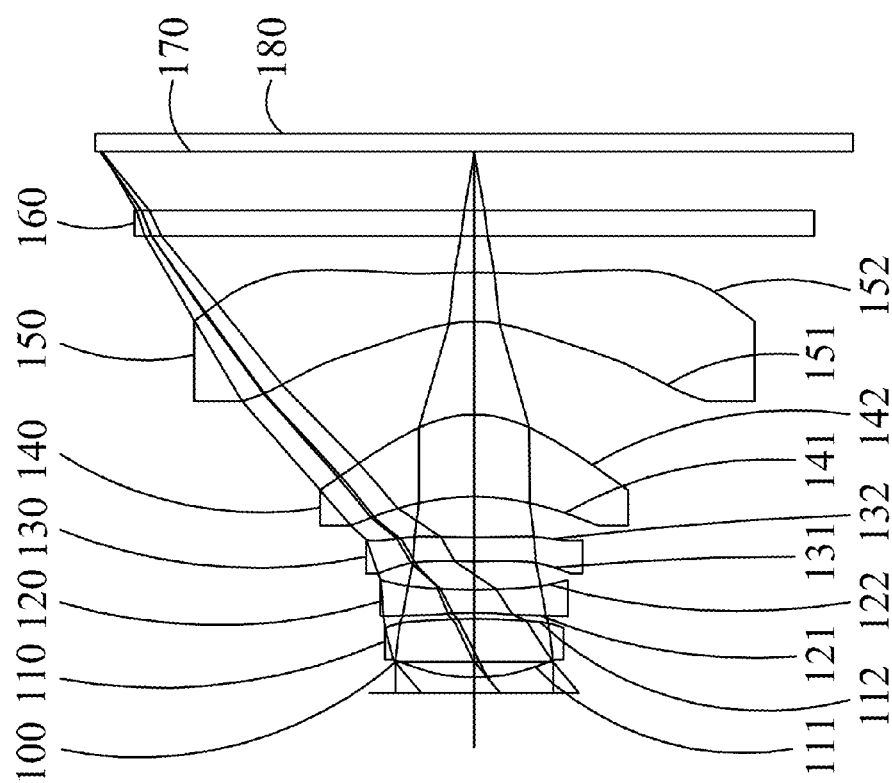
FIG. 4A is a schematic view of a third embodiment of the five-piece imaging lens assembly of the present disclosure.

Please refer to FIG. 4A which is a schematic view of a third embodiment of the five-piece imaging lens assembly of the present disclosure. As shown in FIG. 4A, the structures of the lenses of the third embodiment are similar to that of the first embodiment, but their differences are in the detailed optical data shown in table 5. The object-side surface and the image-side surface of the first lens element 110 to the fifth lens element 150 are made according to the equation (1).

The object-side surfaces and the image-side surfaces of the first lens element 110 to the fifth lens element 150 are made according to the equation (1), and their aspheric parameters are shown in table 6. The maximum height difference S10H of the fifth lens element approaching the image-side surface and the optical axis being the center and within the diameter range of the aperture stop is 0.0049 mm, and the diameter AD of the aperture stop is 1.288 mm, the focus length f of the optical lens assembly is 3.607 mm, the half of the maximal field of view HFOV of the optical lens assembly is 38.492 deg, the distance STL along the optical axis from the aperture stop to the image-side surface of the fifth lens element is 3.191 mm, the distance FL along the optical axis from the object-side surface of the first lens element to the image-side surface of the fifth lens element is 3.316 mm, the distance T45 along the optical axis from the image-side surface of the fourth lens element to the object-side surface of the fifth lens element is 0.763 mm, the distance BFL along the optical axis from the image-side surface of the fifth lens element to the image plane is 0.993 mm, the distance TTL along the optical axis from the object-side surface of the from first lens element to the image plane is 4.308 mm, the central thickness ct1 of the first lens element is 0.479 mm, the central thickness ct2 of the second lens element is 0.190 mm, the diagonal length Dg of an imaging area formed on the image plane by the maximal field of view of the optical lens assembly is 5.712 mm, |S10H/AD|*100=0.38043, AD/f=0.357, HFOV/f=10.672, STL/FL=0.9276, TTL/T45=5.646, TTL/BFL=4.338, ct1/ct2=2.521, AD/Dg=0.2255.

TABLE 5 detailed optical data of lenses of the third embodiment
Detailed optical data of lenses of the third embodiment

| Surface | | Radius (mm) | Thickness (mm) | Nd | Vd |
|---|---|---|---|---|---|
| Aperture stop | | ∞ | −0.125 | | |
| First lens element | first surface | 1.450 | 0.479 | 1.544 | 56.093 |
| | Second surface | −5.645 | 0.049 | | |
| Second lens element | Third surface | −3.171 | 0.190 | 1.607 | 26.646 |
| | Fourth surface | 8.096 | 0.230 | | |
| Third lens element | Fifth surface | 7.347 | 0.198 | 1.643 | 22.465 |
| | Sixth surface | 6.727 | 0.332 | | |
| Fourth lens element | Seventh surface | −1.909 | 0.673 | 1.544 | 56.093 |
| | Eighth surface | −0.920 | 0.763 | | |
| Fifth lens element | Ninth surface | −1.012 | 0.400 | 1.514 | 56.782 |
| | Tenth surface | −7.648 | 0.3 | | |
| Cut-off filter | Eleventh surface | ∞ | 0.21 | 1.517 | 64.167 |
| | Twelfth surface | ∞ | 0.482 | | |

TABLE 6 the aspheric parameters of the third embodiment

| | Optical surface | | | | |
|---|---|---|---|---|---|
| | 1 | 2 | 3 | 4 | 5 |
| k | 1.6254 | 26.7226 | −2.1679 | 69.5180 | 0.0000 |
| A | −0.0979 | 0.0943 | 0.3790 | 0.2036 | −0.4329 |
| B | 0.2031 | −0.0161 | −0.4836 | −0.6037 | 0.2692 |
| C | −2.8224 | −1.8540 | −0.2162 | 2.0263 | −1.9902 |
| D | 11.0075 | 7.0674 | 4.4989 | −4.1169 | 4.6541 |
| E | −23.9892 | −15.8709 | −14.6336 | 4.3617 | −4.4292 |
| F | 25.3158 | 16.9337 | 19.2220 | −2.2479 | 4.1078 |
| G | −11.0970 | −6.3393 | −8.3087 | 0.5654 | −2.9268 |
| H | 0 | 0 | 0 | 0 | 0 |
| J | 0 | 0 | 0 | 0 | 0 |

| | Optical surface | | | | |
|---|---|---|---|---|---|
| | 6 | 7 | 8 | 9 | 10 |
| k | 0.0000 | −21.2127 | −0.7580 | −3.3154 | 0.0000 |
| A | −0.2507 | −0.3638 | 0.1263 | 0.2567 | 0.1958 |
| B | 0.1690 | 1.0180 | −0.0180 | −0.2547 | −0.1791 |
| C | −0.9315 | −1.6385 | 0.1861 | 0.1118 | 0.0859 |
| D | 1.9658 | 1.3726 | −0.3165 | −0.0202 | −0.0261 |
| E | −1.5816 | −0.5916 | 0.2581 | −0.0013 | 0.0049 |
| F | 1.2412 | 0.1947 | −0.1053 | 0.0010 | −0.0005 |
| G | −0.6829 | −0.0763 | 0.0167 | −0.0001 | 2.5050e−005 |
| H | 0 | 0 | 0 | 0 | 0 |
| J | 0 | 0 | 0 | 0 | 0 |

Figure 4B:
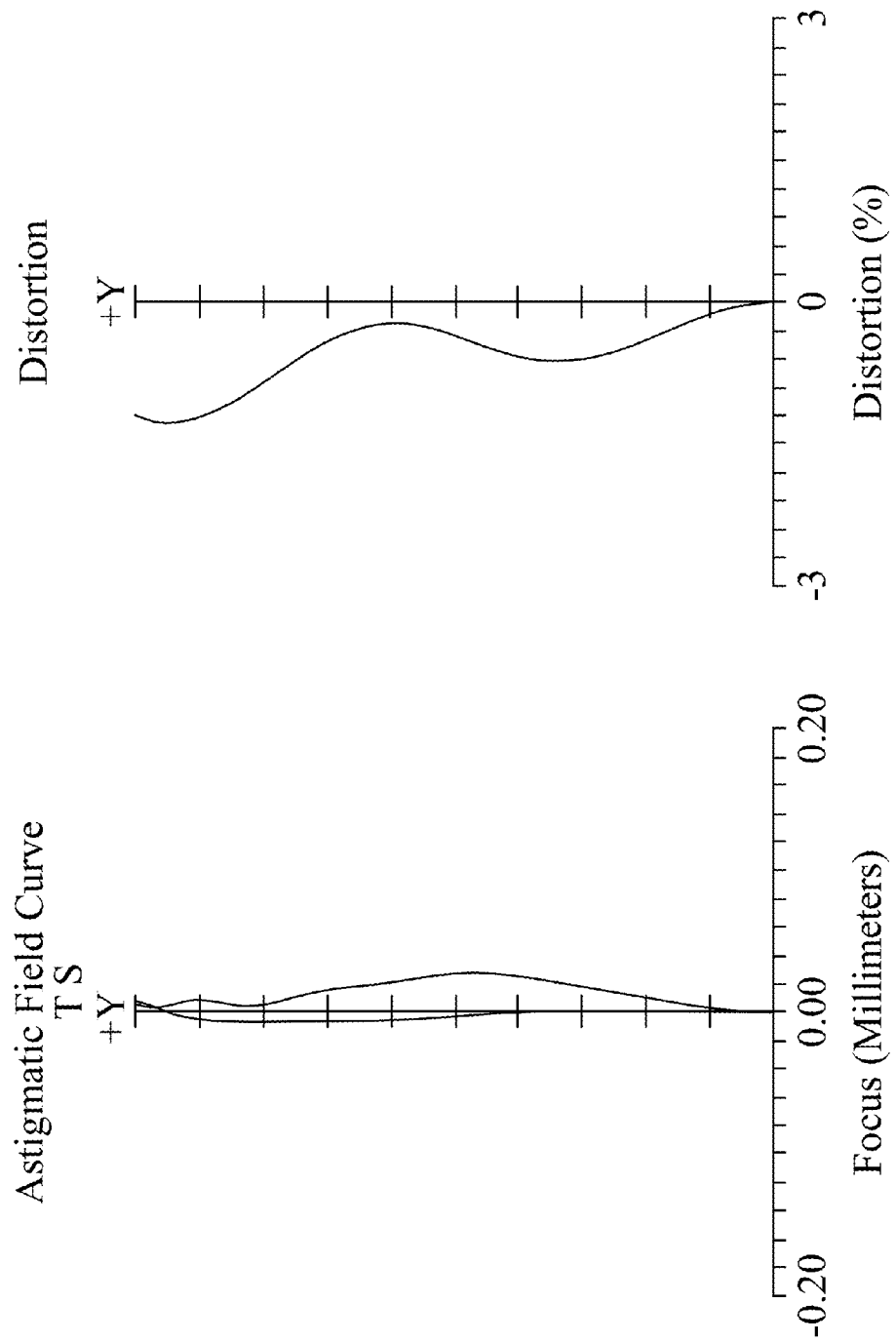
FIG. 4B is a curve diagram of the astigmatic field and the distortion of the third embodiment of the present disclosure.
Figure 4C:
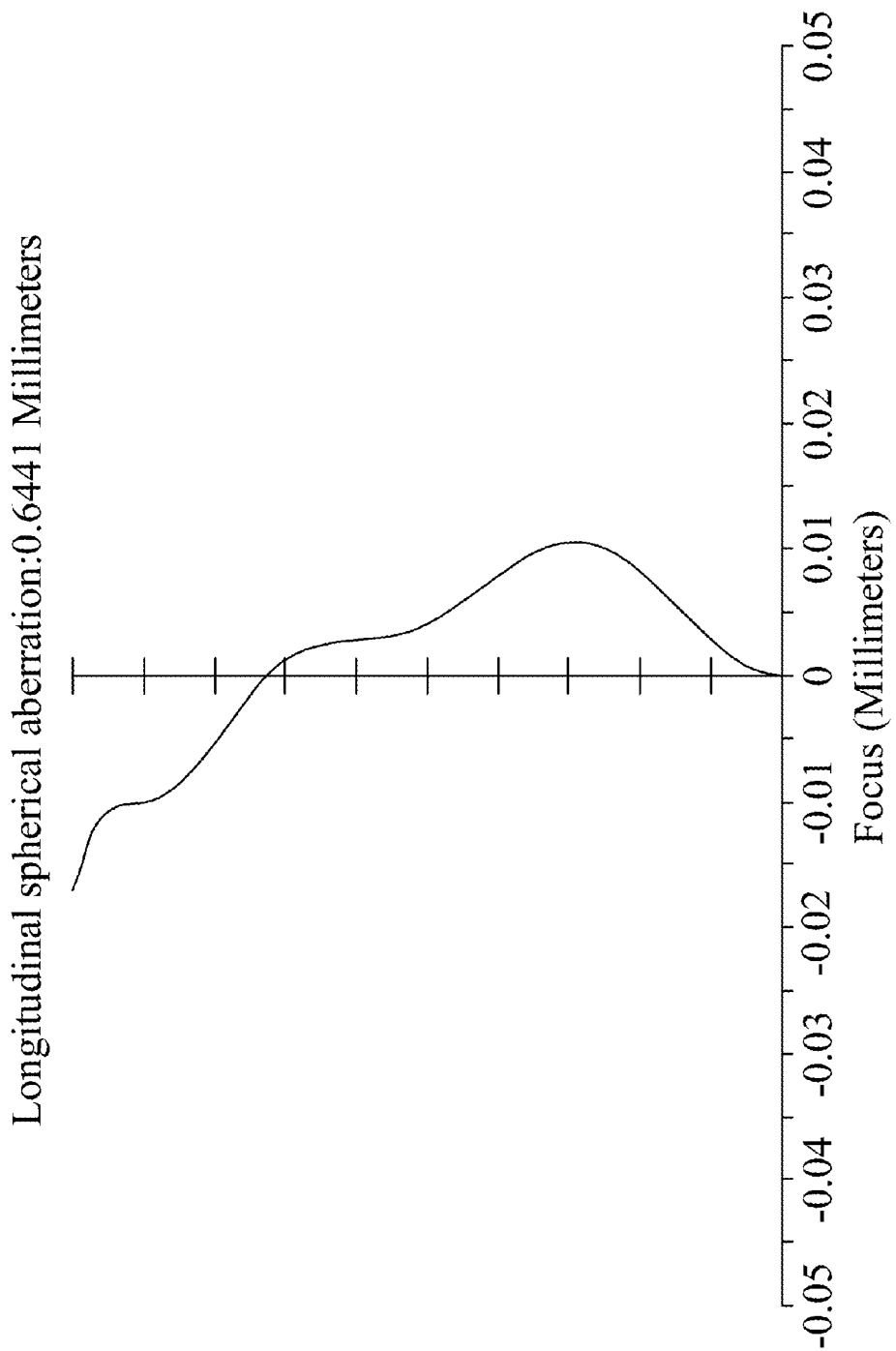
FIG. 4C is a curve diagram of the longitudinal spherical aberration of the third embodiment of the present disclosure.

According to the detailed optical data of lenses in table 5 and the aberration curve shown in FIG. 4B and FIG. 4C, the third embodiment of the five-piece imaging lens assembly of the present disclosure has fine compensation for astigmatic field, distortion, and spherical aberration.

Figure 5A:
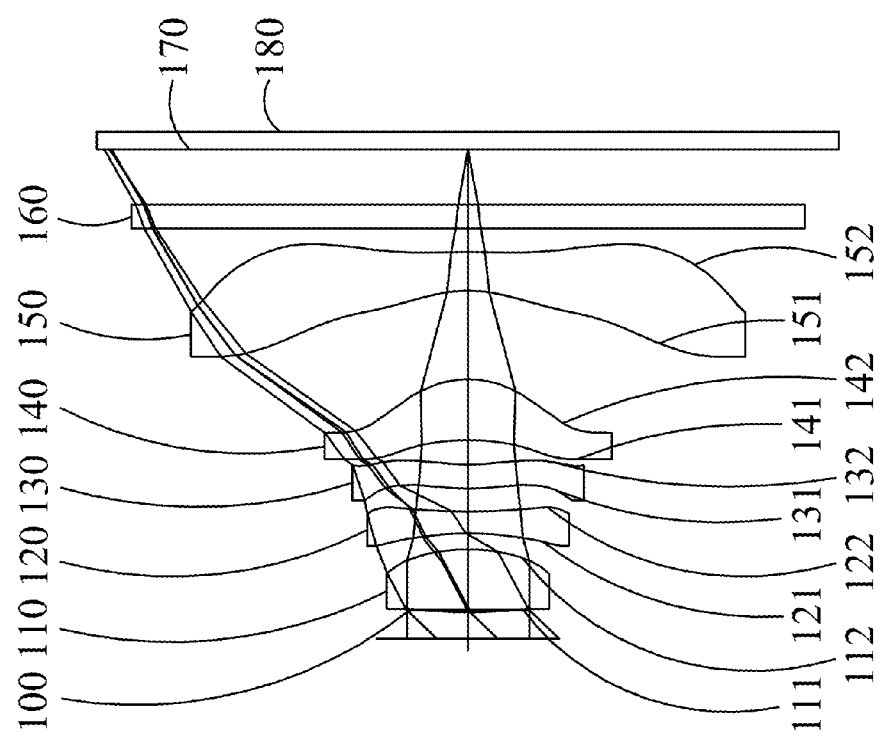
FIG. 5A is a schematic view of a fourth embodiment of the five-piece imaging lens assembly of the present disclosure.

Please refer to FIG. 5A which is a schematic view of a fourth embodiment of the five-piece imaging lens assembly of the present disclosure. As shown in FIG. 5A, the structures of the lenses of the fourth embodiment are similar to that of the first embodiment, but their differences are in the detailed optical data shown in table 7. The object-side surfaces and the image-side surfaces of the first lens element 110 to the fifth lens element 150 are made according to the equation (1).

The object-side surfaces and the image-side surfaces of the first lens element 110 to the fifth lens element 150 are made according to the equation (1), and their aspheric parameters are shown in table 8. The maximum height difference S10H of the fifth lens element approaching the image-side surface and the optical axis being the center and within the diameter range of the aperture stop is −0.001 mm, and the diameter AD of the aperture stop is 1.051 mm, the focus length f of the optical lens assembly is 2.994 mm, the half of the maximal field of view HFOV of the optical lens assembly is 43.996 deg, the distance STL along the optical axis from the aperture stop to the image-side surface of the fifth lens element is 3.071 mm, the distance FL along the optical axis from the object-side surface of the first lens element to the image-side surface of the fifth lens element is 3.091 mm, the distance T45 along the optical axis from the image-side surface of the fourth lens element to the object-side surface of the fifth lens element is 0.763 mm, the distance BFL along the optical axis from the image-side surface of the fifth lens element to the image plane is 0.880 mm, the distance TTL along the optical axis from the object-side surface of the from first lens element to the image plane is 3.971 mm, the central thickness ct1 of the first lens element is 0.538 mm, the central thickness ct2 of the second lens element is 0.188 mm, the diagonal length Dg of an imaging area formed on the image plane by the maximal field of view of the optical lens assembly is 5.712 mm, |S10H/AD|*100=0.095, AD/f=0.351, HFOV/f=14.695, STL/FL=0.9935, TTL/T45=5.205, TTL/BFL=4.513, ct1/ct2=2.862, AD/Dg=0.1840.

TABLE 7 detailed optical data of lenses of the fourth embodiment.
Detailed optical data of lenses of the fourth embodiment

| Surface | | Radius (mm) | Thickness (mm) | Nd | Vd |
|---|---|---|---|---|---|
| Aperture stop | | ∞ | −0.020 | | |
| Fifth lens element | First surface | 2.932 | 0.538 | 1.544 | 56.093 |
| | Second surface | −1.722 | 0.139 | | |
| Second lens element | Third surface | −2.413 | 0.188 | 1.607 | 26.646 |
| | Fourth surface | 7.103 | 0.197 | | |
| Third lens element | Fifth surface | 1.859 | 0.204 | 1.643 | 22.465 |
| | Sixth surface | 1.614 | 0.211 | | |
| Fourth lens element | Seventh surface | −2.304 | 0.523 | 1.544 | 56.093 |
| | Eighth surface | −0.801 | 0.763 | | |
| Fifth lens element | Ninth surface | −1.051 | 0.329 | 1.514 | 56.782 |
| | Tenth surface | −9.961 | 0.300 | | |
| Cut-off filter | Eleventh surface | ∞ | 0.21 | 1.517 | 64.167 |
| | Twelfth surface | ∞ | 0.370 | | |

TABLE 8 the aspheric parameters of the fourth embodiment

| | \multicolumn{5}{c}{Optical surface} | | | | |
|---|---|---|---|---|---|
| | 1 | 2 | 3 | 4 | 5 |
| k | −2.3848 | 0.5791 | 7.4048 | 64.8858 | 0.0000 |
| A | −0.1186 | −0.1351 | 0.3388 | 0.1370 | −0.8316 |
| B | −0.5065 | 0.1148 | −0.3706 | −0.3136 | 0.9075 |
| C | 1.1304 | −2.3892 | −1.9649 | 0.9965 | −0.1347 |
| D | 0.7773 | 4.3111 | 5.5333 | −7.4773 | −2.3003 |
| E | −33.2182 | 12.6870 | 6.4207 | 20.3464 | 4.8642 |
| F | 111.4926 | −52.3522 | −31.2858 | −25.4588 | −6.9508 |
| G | −124.2698 | 47.8066 | 25.8239 | 11.7806 | 4.3081 |
| H | 0 | 0 | 0 | 0 | 0 |
| J | 0 | 0 | 0 | 0 | 0 |

| | \multicolumn{5}{c}{Optical surface} | | | | |
|---|---|---|---|---|---|
| | 6 | 7 | 8 | 9 | 10 |
| k | 0.0000 | 0.0000 | −0.6270 | −0.9335 | 0.0000 |
| A | −0.9495 | −0.4302 | 0.0461 | 0.5117 | 0.2155 |
| B | 1.6114 | 0.6970 | −0.0598 | −0.3300 | −0.1855 |
| C | −3.5139 | −0.0081 | 0.6932 | 0.0919 | 0.0838 |
| D | 7.1796 | −0.0532 | −0.4536 | −0.0025 | −0.0250 |
| E | −10.0945 | −0.4090 | 0.1394 | −0.0042 | 0.0047 |
| F | 7.7810 | 0.3752 | −0.0977 | 0.0008 | −0.0005 |
| G | −2.3616 | −0.1063 | 0.0402 | −5.6105 | 2.4634e−005 |
| H | 0 | 0 | 0 | 0 | 0 |
| J | 0 | 0 | 0 | 0 | 0 |

Figure 5B:
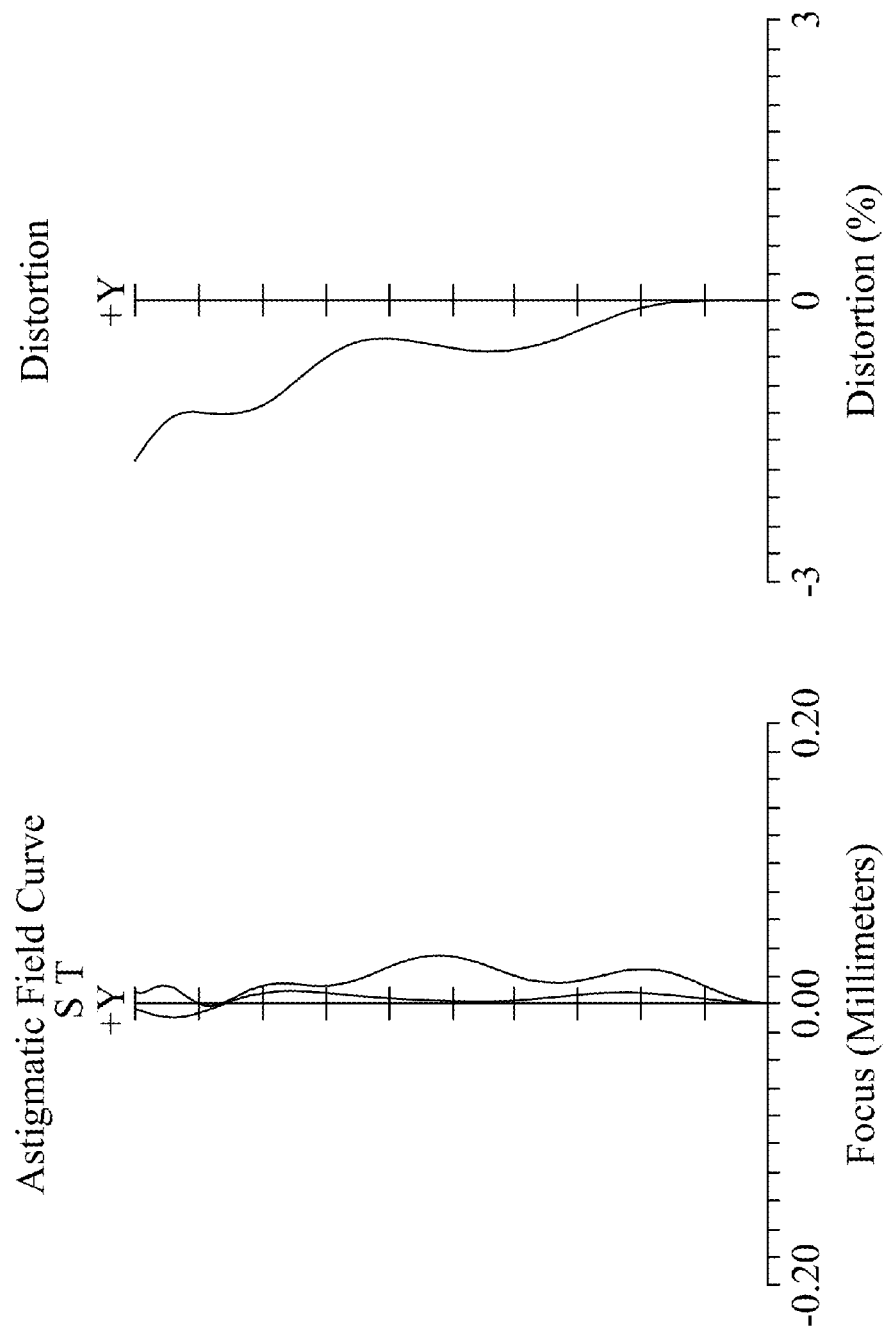
FIG. 5B is a curve diagram of the astigmatism and the distortion of the fourth embodiment of the present disclosure.
Figure 5C:
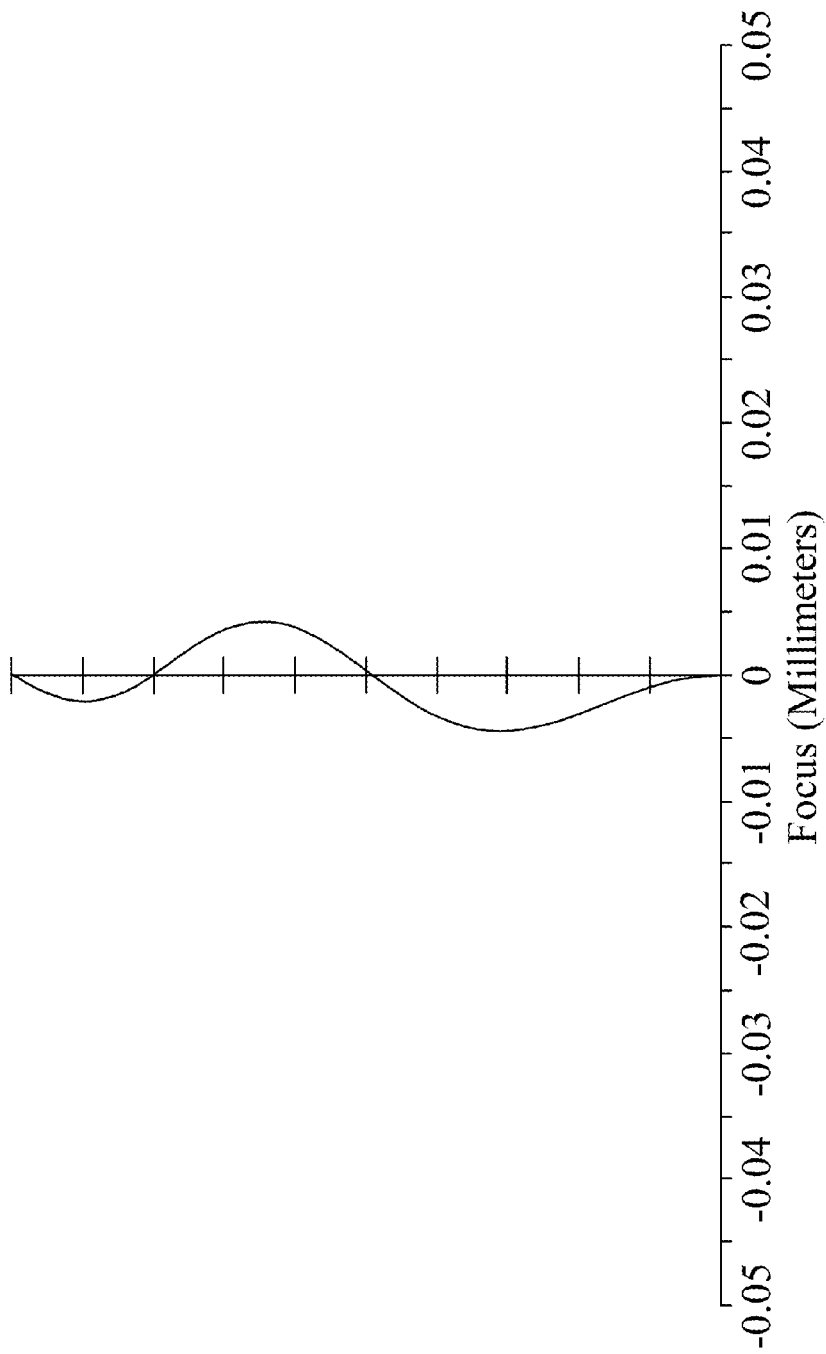
FIG. 5C is a curve diagram of the longitudinal spherical aberration of the fourth embodiment of the present disclosure.

According to the detailed optical data of lenses in table 7 and the aberration curve shown in FIG. 5B and FIG. 5C, the fourth embodiment of the five-piece imaging lens assembly of the present disclosure has fine compensation for astigmatic field, distortion, and spherical aberration.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A five-piece imaging lens assembly, comprising:
an aperture stop;
an optical lens assembly, in order from an object side to an image side comprising:
a first lens element with positive refractive power adjacent to the optical axis, having a convex object-side surface adjacent to the optical axis;
a second lens element with negative refractive power adjacent to the optical axis, having a concave object-side surface adjacent to the optical axis;
a third lens element with refractive power adjacent to the optical axis;
a fourth lens element with refractive power adjacent to the optical axis; and
a fifth lens element with negative refractive power adjacent to the optical axis, having a convex image-side surface, and at least one of the object-side surface and the image-side surface of the fifth lens having an inflection point located between the optical axis and the peripheral surface; and
an image plane, for image formation for an object;
wherein the maximum height difference of the fifth lens element approaching the image-side surface and the optical axis being the center within the diameter range of the aperture stop is S10H, the diameter of the aperture stop is AD, and they satisfy the relation:

$|S10H/AD|*100<1.5$.

2. The five-piece imaging lens assembly according to claim 1, wherein a focus length of optical lens assembly is f, the half of the maximal field of view of the optical lens assembly is HFOV, a distance along optical axis from the aperture stop to the image-side surface of the fifth lens element is STL, a distance along the optical axis from the object-side surface of the first lens element to the image-side surface of the fifth lens element is FL, a distance along the optical axis from the object-side surface of the first lens element to the image plane is TTL, and a distance along the optical axis from the image-side surface of the fourth lens element to the object-side surface of the fifth lens element is T45, and a distance along the optical axis from the image-side surface of the fifth lens element to the image plane is BFL, and they satisfy the relations:

$0.1<AD/f<1.0$, $5.0<HFOV/f<20.0$, $0.5<STL/FL<1.2$, $3.0<TTL/T45<9.0$, $2.0<TTL/BFL<6.0$.

3. The five-piece imaging lens assembly according to claim 1, wherein a central thickness of the first lens element is ct1, the central thickness of the second lens element is ct2, and they satisfy the relation:

$1.0<ct1/ct2<5.0$.

4. A five-piece imaging lens assembly, comprising:
an aperture stop;
an optical lens assembly, in order from an object side to an image side, comprising:
a first lens element with positive refractive power adjacent to the optical axis, having a convex object-side surface adjacent to the optical axis;
a second lens element with negative refractive power adjacent to the optical axis, having a concave object-side surface adjacent to the optical axis;
a third lens element with refractive power adjacent to the optical axis;
a fourth lens element with positive refractive power adjacent to the optical axis;
a fifth lens element with negative refractive power adjacent to the optical axis, having a convex image-side surface adjacent to the optical axis, at least one of the object-side surface and the image-side surface of the fifth lens element having an inflection point; and
an image plane, for image formation for an object;
wherein a diameter of the aperture stop is AD, a diagonal length of an imaging area formed on the image plane by the maximal field of view of the optical lens assembly is Dg, and they satisfy the relation:

$0.0<AD/Dg<0.5$.

5. The five-piece imaging lens assembly according to claim 4, wherein a focus length of the optical lens assembly is f, a half of the maximal field of view of the optical lens assembly is HFOV, a distance along the optical axis from the aperture stop to the image-side surface of the fifth lens element is STL, a distance along the optical axis from the object-side surface of the first lens element to the image-side surface of the fifth lens element is FL, and they satisfy the relations:

$$0.1 < AD/f < 1.0,$$

$$5.0 < HFOV/f < 20.0,$$

$$0.5 < STL/FL < 1.2.$$

6. The five-piece imaging lens assembly according to claim 4, wherein a distance along the optical axis from the object-side surface of the from first lens element to the image plane is TTL, a distance along the optical axis from the image-side surface of the fourth lens element to the object-side surface of the fifth lens element is T45, a distance along the optical axis from the image-side surface of the fifth lens element to the image plane is BFL, a central thickness of the first lens element is ct1, a central thickness of the second lens element is ct2, and they satisfy the relations:

$$3.0 < TTL/T45 < 9.0,$$

$$2.0 < TTL/BFL < 6.0,$$

$$1.0 < ct1/ct2 < 5.0.$$

7. A five-piece image capture module, comprising:
an aperture stop;
an optical lens assembly, in order from an object side to an image side, comprising:
  a first lens element with positive refractive power adjacent to the optical axis, having a convex object-side surface adjacent to the optical axis;
  a second lens element with negative refractive power adjacent to the optical axis, having a concave object-side surface adjacent to the optical axis;
  a third lens element with refractive power adjacent to the optical axis;
  a fourth lens element with refractive power adjacent to the optical axis and made of plastic;
  a fifth lens element with negative refractive power adjacent to the optical axis, having a convex image-side surface, and at least one of the object-side surface and the image-side surface of the fifth lens having an inflection point, the fifth lens element made of plastic; and
an image sensing unit, disposed on an image plane for image formation for an object; wherein a distance along the optical axis from the object-side surface of the first lens element to the image plane is TTL, a distance along the optical axis from the image-side surface of the fourth lens element to the object-side surface of the fifth lens element is T45, a distance along the optical axis from the image-side surface of the fifth lens element to the image plane is BFL, and they satisfy the relations:

$$3.0 < TTL/T45 < 9.0,$$

$$2.0 < TTL/BFL < 6.0.$$

8. The five-piece optical image capture module according to claim 7, wherein a diameter of the aperture stop is AD, a focus length of the optical lens assembly is f, a half of the maximal field of view of the optical lens assembly is HFOV, a distance along the optical axis from the aperture stop to the image-side surface of the fifth lens element is STL, a distance along the optical axis from the object-side surface of the first lens element to the image-side surface of the fifth lens element is FL, and they satisfy the relations:

$$0.1 < AD/f < 1.0,$$

$$5.0 < HFOV/f < 20.0,$$

$$0.5 < STL/FL < 1.2.$$

9. The five-piece optical image capture module according to claim 7, wherein a central thickness of the first lens element is ct1, a central thickness of the second lens element is ct2, and they satisfy the relations:

$$1.0 < ct1/ct2 < 5.0.$$

* * * * *